United States Patent [19]
Woo et al.

[11] Patent Number: 5,196,867
[45] Date of Patent: Mar. 23, 1993

[54] EXTENSION OF DYNAMIC RANGE FOR CONTINUOUS TONE LASER PRINTERS

[75] Inventors: Nea-Yea Woo, Rochester; Kwok-leung Yip, Webster, both of N.Y.

[73] Assignee: Eastman Kodak Company, Rochester, N.Y.

[21] Appl. No.: 681,792

[22] Filed: Apr. 8, 1991

[51] Int. Cl.$^5$ .................................................. H04N 1/21
[52] U.S. Cl. ..................................... 346/108; 358/298
[58] Field of Search ................. 346/108, 160; 358/296, 358/298; 389/305

[56] References Cited

U.S. PATENT DOCUMENTS

| | | |
|---|---|---|
| 4,379,631 | 4/1983 | Kitamura . |
| 4,577,932 | 3/1986 | Coelbart .............................. 359/305 |
| 4,783,680 | 11/1988 | Maloney . |
| 4,992,804 | 2/1991 | Roe .................................... 346/108 |

*Primary Examiner*—Mark J. Reinhart
*Attorney, Agent, or Firm*—William F. Noval

[57] ABSTRACT

The dynamic range of a continuous tone laser printer is extended by directly modulating a diode laser while simultaneously modulating the optical output of the diode laser with an acousto-optic modulator. The digital image value is input to two look-up tables (LUTs) that convert the image value to two digital words; one to set the power level of the diode laser, and the other to set the diffraction efficiency of the acousto-optic modulator (AOM). The first look-up table is constructed from the performance characteristics of the diode laser, and the second look-up table is constructed from the performance characteristics of the AOM. The look-up table digital outputs are applied to respective digital to analog converters whose analog outputs respectively drive a voltage to current driver for the diode laser and a radio frequency dirver for the AOM. The resulting power of the writing laser beam is a linear function of the input image value.

9 Claims, 3 Drawing Sheets

EXTENSION OF DYNAMIC RANGE FOR CONTINUOUS TONE LASER PRINTERS

TECHNICAL FIELD

In general, the present invention relates to a continuous tone laser imaging system and more particularly the present invention relates to a continuous tone laser printer for exposing film which has an extended dynamic range.

BACKGROUND ART

Laser imaging systems have found wide applicability in the reproduction of digital data and digital images on hard copy, such as paper or film. Typically, either a gas laser or a diode laser is used as the laser source.

Modulation of the gas laser may be effected by means of an acousto-optic modulator which modulates the laser beam produced by the gas laser. When a laser diode is the laser source, it may be modulated directly by the input digital signal. However, in both cases, the dynamic range of the laser imaging system is limited by either the acousto-optic modulator or the diode laser. A typical acousto-optic modulator has a dynamic range of 300:1, while a typical diode laser has a dynamic range of 150:1. These dynamic ranges may be sufficient for normal laser printer/copier applications such as disclosed in U.S. Pat. No. 4,379,631, issued Apr. 12, 1983, entitled "Apparatus Having a Copier Function and a Printer Function", and U.S. Pat. No. 4,783,680, issued Nov. 8, 1988, entitled "Halftone Screening System for Printer/Copier". Both of these patents disclose electrophotographic systems using either a directly modulated laser diode or a gas laser whose output beam is modulated by means of an acousto-optic modulator.

These limited dynamic ranges are not large enough to cover the whole dynamic range of the recording film (which is typically about 1,000:1) when high contrast radiographic images are printed. For example, in the printing of a radiographic image, the maximum density of the original image can be as high as 4.0. Due to the limited dynamic range of the acousto-optic modulator, a currently available radiographic laser printer can only reproduce images with 2.8 maximum density. As a result, some valuable diagnostic information is lost and image quality is degraded. There is thus a need in the field of laser printers for a laser printer which utilizes the full dynamic range of the print film and for a technique for extending the dynamic range of the laser printer.

SUMMARY OF THE INVENTION

According to the present invention, there is provided a laser imaging system such as a radiographic laser printer which is capable of fully utilizing the full dynamic range of a print film and which extends the dynamic range for continuous tone printing. According to an aspect of the present invention, there is provided a laser imaging system, including a laser diode and an acousto-optic modulator and means for simultaneously modulating the diode laser and acousto-optic modulator with a digital image signal. The modulating means preferably includes a pair of look-up tables that convert each digital signal image value to two digital words, one which sets the power level of the diode laser, and the other which sets the diffraction efficiency of the acousto-optic modulator. A pair of digital to analog converters convert the digital outputs of the look-up tables to analog outputs which respectively modulate the diode laser and acousto-optic modulator through suitable drivers.

BRIEF DESCRIPTION OF THE DRAWINGS

In the detailed description of the invention presented below, reference is made to the accompanying drawings in which like elements are numbered with like numbers.

DESCRIPTION OF THE PREFERRED EMBODIMENTS

Figure 1:
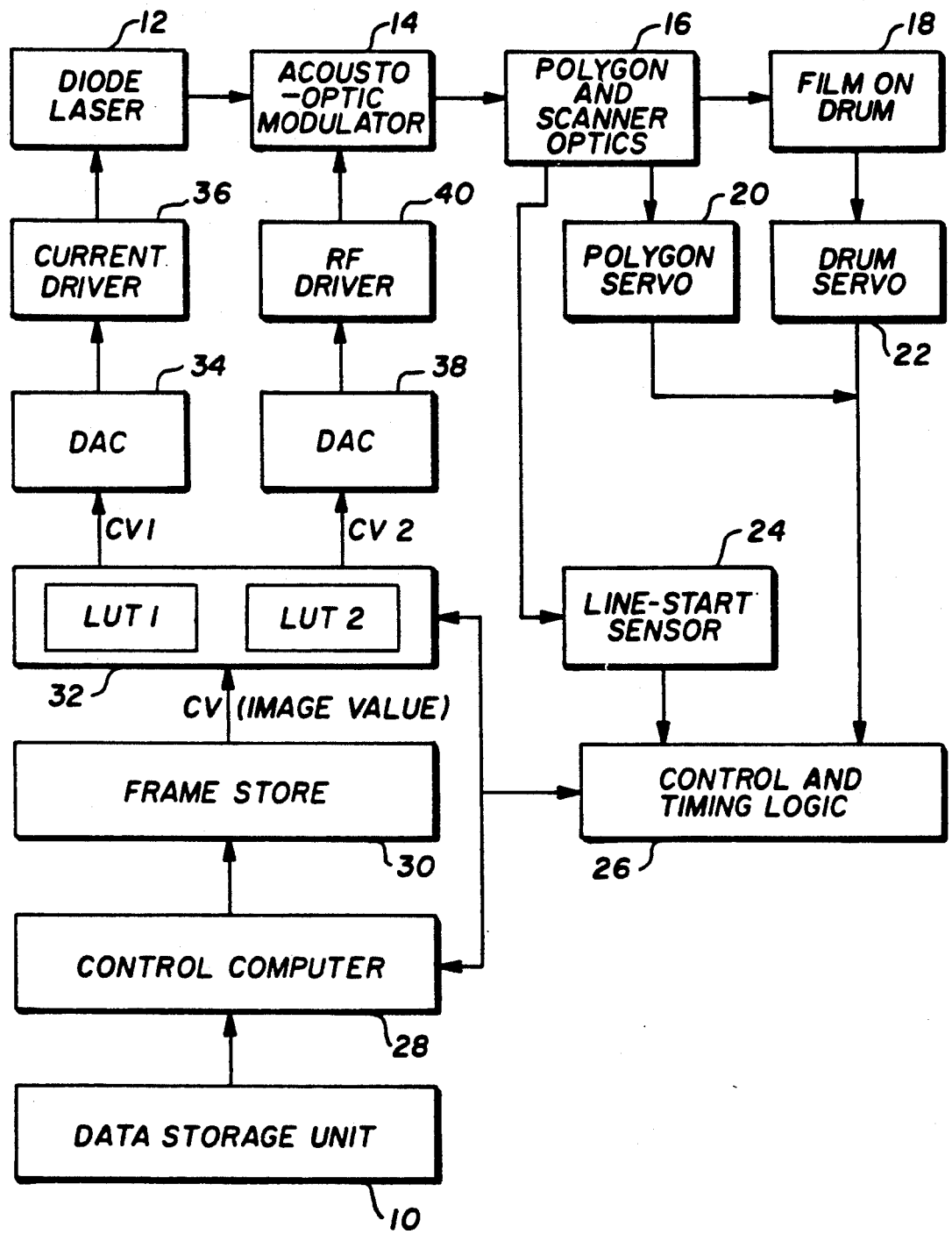
FIG. 1 is a block diagram of a laser imaging system such as a radiographic laser printer, incorporating an embodiment of the present invention.

Referring now to FIG. 1, there is shown a laser imaging system comprising a laser printer for use particularly in radiographic printing applications which incorporates an embodiment of the present invention. As shown, a digital image signal is stored in a data storage unit 10. The digital image signal may be obtained from a number of sources. If the digital signal is a medical diagnostic image signal, it may have been obtained from a well-known medical imaging modality such as a computed tomography scanner, a magnetic resonance imaging scanner, a digital subtraction angiography scanner, an ultrasound scanner, or the like. The medical diagnostic image may also have been obtained by digitizing a radiographic film image or from a computed radiography system in which a digital image is read from a latent radiographic image stored in a storage phosphor.

In general, the laser imaging system includes a diode laser 12 which produces a laser beam optical output which is modulated by acousto-optic modulator 14. The modulated laser beam from modulator 14 is scanned by means of a rotating polygon and scanner optics 16 onto film on a rotating drum 18. The polygon and scanner optics repetitively scan the laser beam across the film in a main scanning direction while the drum moves the film in a subscanning direction. Polygon servo 20 and drum servo 22 control the scanning speed, respectively, of the rotating polygon and drum. A line-start sensor 24 indicates to control and timing logic 26 the start of a scan line. The control computer 28 controls the operation of the components of the laser imaging system.

According to the present invention, the digital image signal from data storage unit 10 is transferred by means of control computer 28 to a frame store 30. Data storage unit 10 comprises a mass storage device such as a magnetic disk drive or optical disk drive, whereas frame store 30 comprises a rapidly accessed memory such as a dynamic random access memory. The digital image signal (to be reproduced on film) stored in frame store 30 comprises a matrix of pixels, each of which has a bit depth represented by a code value CV. As an example, if the pixel depth is 12 bits, each pixel has a decimal Code Value of 0 to 4,095.

The digital image CV from frame store 30 is simultaneously applied to look up tables, LUT1 and LUT2, respectively of dynamic random access memory 32. The output of LUT1 is a digital word CV1 which is applied to digital to analog converter (DAC) 34 which drives current driver 36. The output of LUT2 is a digital word CV2 which is applied to digital to analog converter (DAC) 38 which drives radio frequency drive (RF driver) 40. Current driver 36 directly modulates diode laser 12, while RF driver 40 simultaneously modulates acousto-optic modulator 14.

The operation of the laser imaging system, including the modulation technique of the present invention will be described in greater detail with respect to the diagrams of FIG. 2–FIG. 7. The laser wavelength of diode laser 12 is chosen to be compatible with the response of acousto-optic modulator 14. As an example, diode laser 12 may be a NEC laser diode model NDL3210 with 6 milliwatt power at 675 nanometers, and acousto-optic modulator 14 is a Crystal Technology model 3110 ($TeO_2$) with a 110 megahertz center frequency. It will be appreciated that diode lasers, unlike gas lasers, can be directly modulated at frequencies as high as several hundred megahertz by changing the drive current.

Figure 2:
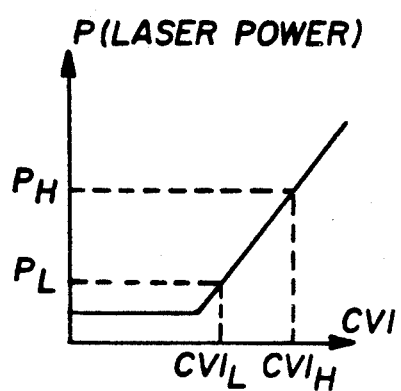
FIG. 2 is a graph showing a typical operating characteristic curve for a diode laser.

FIG. 2 is a operating curve of a diode laser with output laser power (P) plotted against code value CV1. As shown, the operating curve has a non-linear operating region at the lower level of output power and a linear lasing region at its upper level of code values. Thus, it is desirable to operate the diode laser in its linear region. However, this limits the dynamic range of the output laser power.

Figure 3:
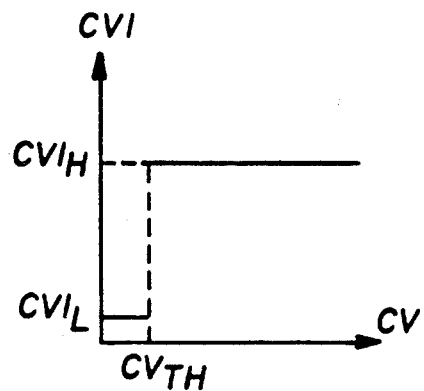
FIG. 3 is a graph illustrating operation of the present invention.

According to the present invention, look-up table (LUT1) converts the image signal code value applied thereto, to two laser diode power outputs ($P_L$ and $P_H$) which are in the linear operating region of the laser diode. As shown in FIG. 3, the output code value (CV1) versus the input code value CV is a linear step function which has a sharp rise transition value ($CV_{TH}$). For input code values below the transition point, the diode laser is operated with a output code value ($CV1_L$) which drives the diode laser at a power output ($P_L$). For input code values above the transition point, the diode laser is operated with an output code value ($CV1_H$) which drives the diode laser at a power output ($P_H$).

Depending on the magnitude of the image value as compared to the predetermined threshold value $CV_{TH}$, the power of diode laser 12 is set so that the ratio of $P_H$ to $P_L$ is much greater than 1. For example, the ratio is five or ten times greater than 1.

Figure 4:
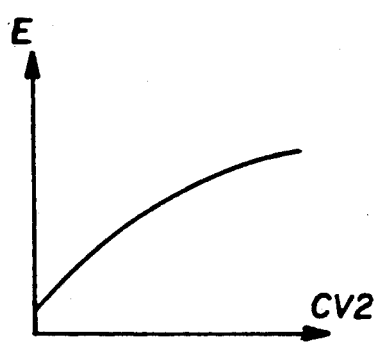
FIG. 4 is a characteristic operating curve of an acousto-optic modulator.
Figure 5:
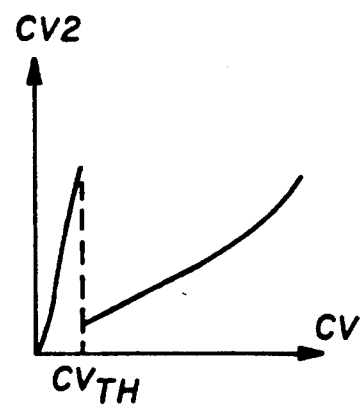
FIG. 5 is a graph illustrating operation of the present invention.

FIG. 4 is a diffraction efficiency E versus code value (CV2) operating curve of acousto-optic modulator 14. FIG. 5 is the AOM calibration curve loaded into LUT2 which is constructed from the calibration of the acousto-optic modulator such that diffraction efficiency of the AOM is a linear function of the input image value. Thus, the input digital image code value CV is converted to the output signal value CV2 by look-up table LUT2.

Figure 6:
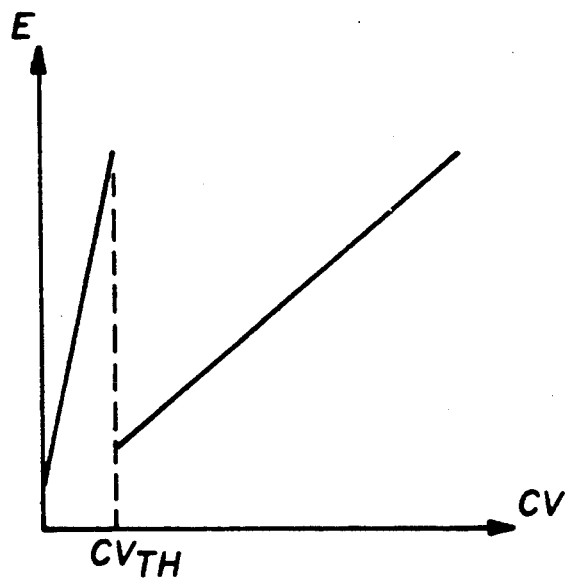
FIG. 6 is a graph showing modulating diffraction efficiency versus input image value.
Figure 7:
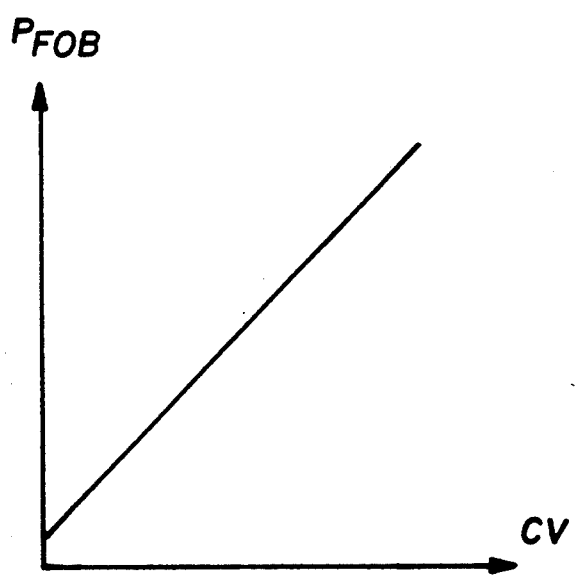
FIG. 7 is a graph of writing beam power versus input image value.

FIG. 6 and 7 show the resulting dependance of the modulator 14 diffraction efficiency E and the power of the BRAGG first order diffracted beam $P_{FOB}$ on the input image value CV. In FIG. 6 it is shown that E varies linearly with the code value CV, but changes slope at the transition code value $CV_{TH}$ at which the laser power is switched from the lower power level $P_L$ to the higher power level $P_H$. FIG. 7 shows that the laser beam power $P_{FOB}$ from AOM 14 is a linear function of the input image signal code value CV. Assuming that the ratio of the laser power level produced by direct modulation of diode laser 12 is five and that the dynamic range of AOM is 300:1, the total dynamic range of the laser beam power (which exposes the radiographic film) becomes 1,500:1. This extended dynamic range is much larger than the dynamic range of either the diode laser or the acousto-optic modulator taken alone. Also, throughout the entire range of input image values, the resolution of the writing beam power ($\Delta P_{FOB}/\Delta CV$) remains constant.

Industrial Applicability and Advantages

The present invention has use in laser imaging systems such as continuous tone radiographic laser printers. By simultaneously modulating the laser diode and an acousto-optical modulator, the extended dynamic range of the laser printer allows printing images with density covering the whole dynamic range of the recording film and allows reproduction of original radiographs having a maximum density as high as 4.0.

Although the invention has been described with reference to preferred embodiments thereof, it will be understood that variations and modifications can be effected within the spirit and scope of the invention as described above and as defined in the appended claims.

What is claimed is:

1. An extended range laser imaging system comprising:
    a laser diode for producing a laser beam having a first dynamic range;
    an acousto-optical modulator for continuously modulating said laser beam and having a second dynamic range; and
    means for applying an continuous tone input image signal to simultaneously modulate said laser diode and said acousto-optic modulator as a function of said input signal wherein an output laser beam is produced having a continuous dynamic range which is a function of and greater than said first and second dynamic ranges.

2. The system of claim 1 wherein said applying means applies a digital image input signal and further includes look-up table means for producing output digital signals which simultaneously drive said diode laser and said acousto-optic modulator in respective linear operating regions.

3. The system of claim 2, including digital to analog conversion means, diode laser driver means and acousto-optic modulator driver means whereby the digital output signal of said look-up table means is applied to said digital to analog converter means to produce analog signals which respectively drive said laser driver means and said modulator driver means to simultaneously modulate said diode laser and said acousto-optic modulator as a function of said output signal from said look-up table means.

4. The system of claim 4, including scanner means for scanning said modulated laser beam onto photosensitive media to produce an image on said media corresponding to said input image signal.

5. The system of claim 4 wherein said input image signal is a radiographic image signal and wherein said photosensitive media is radiographic film such that said laser diode produces a radiographic image on said radiographic film corresponding to said input image signal.

6. An extended range laser imaging system comprising:
- a diode laser for producing a laser beam having a first dynamic range in a linear operating region thereof;
- an acousto-optic modulator for continuously modulating said laser beam and having a second dynamic range; and
- means for applying a continuous tone image signal simultaneously, (1) to modulate said diode laser to produce a laser beam having at least two power output levels $P_L$ and $P_H$ which ar in said linear operating region wherein the ratio of $P_H$ to $P_L$ is much greater than 1; and (2) to modulate said acousto-optic modulator over its dynamic range for each said laser power output level, wherein the dynamic range of said output laser beam is extended and is a product of PH/PL times the second dynamic range of said AOM.

7. The system of claim 1 wherein said ratio of $P_H$ to $P_L$ is in the range of 5:1 to 10:1.

8. The system of claim 6 wherein said applying means applies a digital image input signal and further includes first and second look-up table means for producing output digital signals which simultaneously drive said diode laser and said acousto-optic modulator.

9. The system of claim 8 including first and second digital-to-analog conversion means, diode laser driver means, and acousto-optic modulator driver means, whereby the digital output signals of said first and second look-up table means are respectively applied to said first and second digital-to-analog converter means to produce analog signals which respectively drive said laser driver means and said modulator driver means to simultaneously modulate said diode laser and said acousto-optic modulator as a function of said output signals from said first and second look-up table means.

* * * * *